(12) United States Patent
Broxson (10) Patent No.: US 10,318,145 B2
(45) Date of Patent: Jun. 11, 2019

(54) SMART MIRROR

(71) Applicant: Florida Institute for Human & Machine Cognition, Inc, Pensacola, FL (US)

(72) Inventor: Joshua Broxson, Pensacola, FL (US)

(*) Notice: Subject to any disclaimer, the term of this patent is extended or adjusted under 35 U.S.C. 154(b) by 0 days.

(21) Appl. No.: 15/646,154

(22) Filed: Jul. 11, 2017

(65) Prior Publication Data
US 2018/0032227 A1    Feb. 1, 2018

Related U.S. Application Data (60) Provisional application No. 62/367,669, filed on Jul. 28, 2016.

(51) Int. Cl.
| | |
|---|---|
| *G06F 3/0488* | (2013.01) |
| *A47G 1/02* | (2006.01) |
| *G06F 1/16* | (2006.01) |
| *G06F 1/18* | (2006.01) |
| *G06F 3/03* | (2006.01) |
| *G06F 3/041* | (2006.01) |
| *G06F 3/042* | (2006.01) |
| *G06F 3/0481* | (2013.01) |

(52) U.S. Cl.
CPC ............ *G06F 3/0488* (2013.01); *A47G 1/02* (2013.01); *G06F 1/1605* (2013.01); *G06F 1/1626* (2013.01); *G06F 1/1686* (2013.01); *G06F 1/181* (2013.01); *G06F 3/0304* (2013.01); *G06F 3/0412* (2013.01); *G06F 3/0421* (2013.01); *G06F 3/0425* (2013.01); *G06F 3/04817* (2013.01)

(58) Field of Classification Search
None
See application file for complete search history.

(56) References Cited

U.S. PATENT DOCUMENTS

| | | | | |
|---|---|---|---|---|
| 5,657,563 | A  * | 8/1997 | Lane ...................... | G09F 13/12 40/219 |
| 6,688,518 | B1 * | 2/2004 | Valencia .................. | G07F 9/10 235/379 |
| 6,993,129 | B1 * | 1/2006 | Barr ...................... | G06F 1/1601 379/428.03 |
| 2004/0140350 | A1 * | 7/2004 | Valencia .................. | G07F 9/10 235/375 |
| 2008/0077882 | A1 * | 3/2008 | Kramer .................. | B60K 35/00 715/810 |
| 2009/0167682 | A1 * | 7/2009 | Yamashita ............. | G01C 21/36 345/158 |

(Continued)

*Primary Examiner* — David D Davis
(74) *Attorney, Agent, or Firm* — J. Wiley Horton (57) ABSTRACT

An image storing and display system that is combined with a conventional mirror to create a "smart mirror." A one-way reflective surface is provided over the top of an interactive display. A person in front of the reflective surface can see a normal reflection as would be provided by a conventional mirror. The person can also see images created by the interactive video display that are transmitted through the one-way reflective surface. A camera provided as part of the smart mirror can be used to record digital images that are stored for later recall. The recalled images can then be displayed on the interactive display. A computer is used to drive the interactive display. The display preferably includes touch-based interaction.

20 Claims, 6 Drawing Sheets

(56) References Cited

U.S. PATENT DOCUMENTS

| | | | |
|---|---|---|---|
| 2011/0256914 A1* | 10/2011 | Ahdoot | A63B 24/0003 463/8 |
| 2011/0288938 A1* | 11/2011 | Cook | G06Q 30/0251 705/14.66 |
| 2012/0206449 A1* | 8/2012 | Stark | G06Q 30/0281 345/419 |
| 2013/0182005 A1* | 7/2013 | Fretwell | G06F 3/0488 345/629 |
| 2013/0229482 A1* | 9/2013 | Vilcovsky | H04N 7/144 348/14.07 |
| 2013/0290139 A1* | 10/2013 | Stark | G06T 13/40 705/26.61 |
| 2014/0225977 A1* | 8/2014 | Vilcovsky | G06Q 30/00 348/14.07 |
| 2014/0226000 A1* | 8/2014 | Vilcovsky | G06F 3/017 348/77 |
| 2014/0273716 A1* | 9/2014 | Annis | A63H 33/22 446/175 |
| 2016/0080662 A1* | 3/2016 | Saban | G02B 5/08 348/77 |
| 2017/0313248 A1* | 11/2017 | Kothari | B60R 1/008 |

* cited by examiner

SMART MIRROR

CROSS-REFERENCES TO RELATED APPLICATIONS

This non-provisional patent application claims the benefit of an earlier filed provisional application. The provisional application was filed on Jul. 28, 2016 and was assigned Ser. No. 62/367,669. The provisional application listed the same inventor.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention pertains to the field of interactive displays. More specifically, the invention comprises a smart mirror that displays computer-generated images through a reflective surface and allows touch-based user interactions.

2. Description of the Related Art

Conventional mirrors have been used for centuries to review a user's choice of clothing. A mirror is obviously a "real-time" device that shows you only what you are wearing at the present time. A conventional mirror cannot tell a user what he or she wore the day before or provide a listing of how many times a particular item has been worn in the past thirty days.

Many systems presently exist that capture images and store them for recall at a later time. For example, a digital camera and a flat panel LCD can be employed to take an image of a user, store it over time, and display it when desired. The present invention seeks to combine this store and recall functionality with the traditional advantages of a conventional mirror.

BRIEF SUMMARY OF THE INVENTION

The present invention comprises an image storing and display system that is combined with a conventional mirror to create a "smart mirror." A one-way reflective surface is provided over the top of an interactive display. A person in front of the reflective surface can see a normal reflection as would be provided by a conventional mirror. The person can also see images created by the interactive video display that are transmitted through the one-way reflective surface.

A camera provided as part of the smart mirror can be used to record digital images that are stored for later recall. The recalled images can then be displayed on the interactive display. A computer is used to drive the interactive display. The display preferably includes touch-based interaction. In the preferred embodiments, the computer causes the interactive display to produce visible icons and images. The user is able to touch the icons and images and thereby interact with the computer. As one example, the smart mirror can store images of the user over the past 30 days. These images may be selectively called up and displayed so that the user may easily review recent wardrobe choices.

REFERENCE NUMERALS IN THE DRAWINGS

10 smart mirror
12 chassis
14 reflective surface
16 power connector
18 lighting connector
20 data connector
22 one-way mirror
24 interactive display
26 camera
28 cable
30 cable
32 computer
34 power supply
36 sink
38 overhead light
40 supplemental light
42 floor mount
44 trunnion assembly
46 camera shuttle
48 magnetic strip
50 inductive charger
52 cable
54 charging area
56 display area
58 image display
60 icon
62 icon
64 image display
66 wireless antenna
68 cable
70 touch-based interface

DETAILED DESCRIPTION OF THE INVENTION

The present invention may be implements in a wide variety of forms. FIGS. 1-6 illustrate two embodiments of the invention. They should properly be viewed as illustrative examples taken from a set of many more possibilities.

Figure 1:
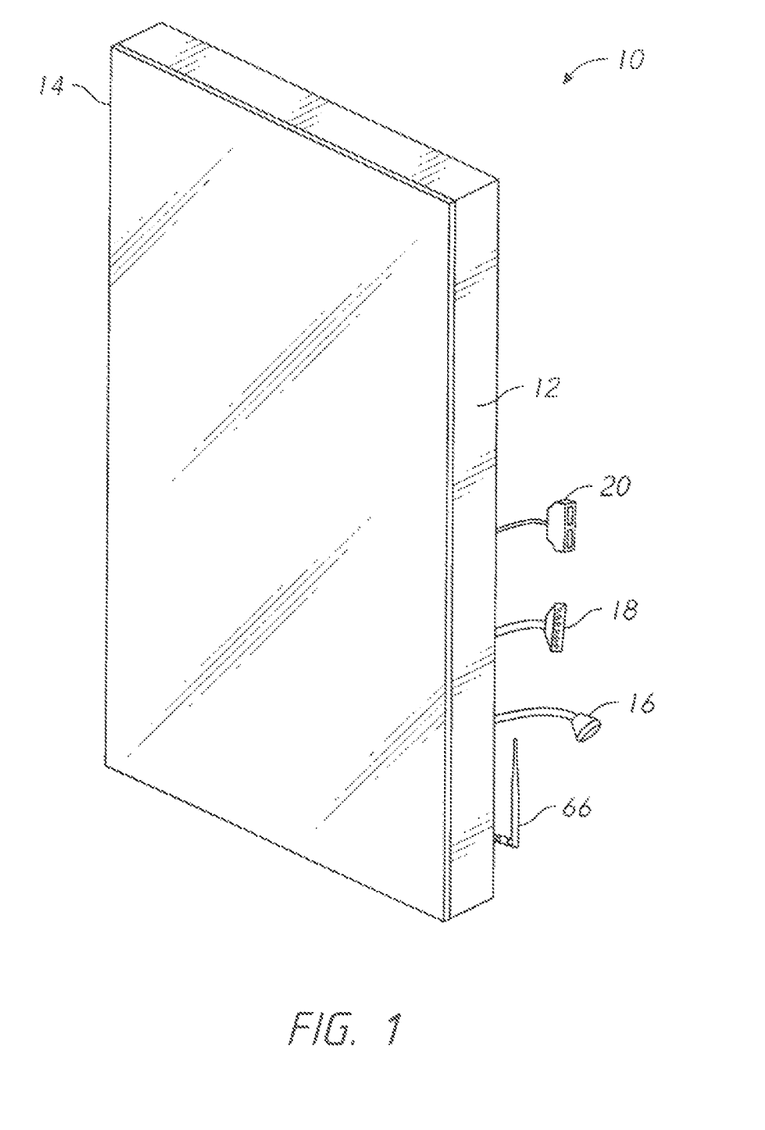
FIG. 1 is a perspective view, showing an embodiment of the present invention.

The present invention may be used in lieu of a conventional mirror, and thus is preferably configured for installation wherever a conventional mirror may be installed. One common installation for a conventional mirror is over a bathroom vanity. FIG. 1 depict an embodiment of smart mirror 10 that is configured for a bathroom vanity installation.

Smart mirror 10 is built on chassis 12. Reflective surface 14 is located on the side facing the user. The reflective surface is a one-way reflective surface created by depositing a thin and almost transparent layer of metal on a plate of polished glass. As those skilled in the art will know, light passes through such a surface in both directions. However, the interior of chassis 12 will ordinarily be darker than the area in front of reflective surface 14. As a result, a user viewing reflective surface 14 perceives it as a conventional mirror.

Chassis 10 preferably contains a video display, a computer, and other associated components. The inventive mirror may be connected to external components as well. Power connector 16 receives AC line power. Lighting connector 18 may be used to control external lighting. Data connector 20 may be used to connect the internal computer to external digital devices. Wireless antenna 66 may be used to send and receive wireless signals.

Figure 2:
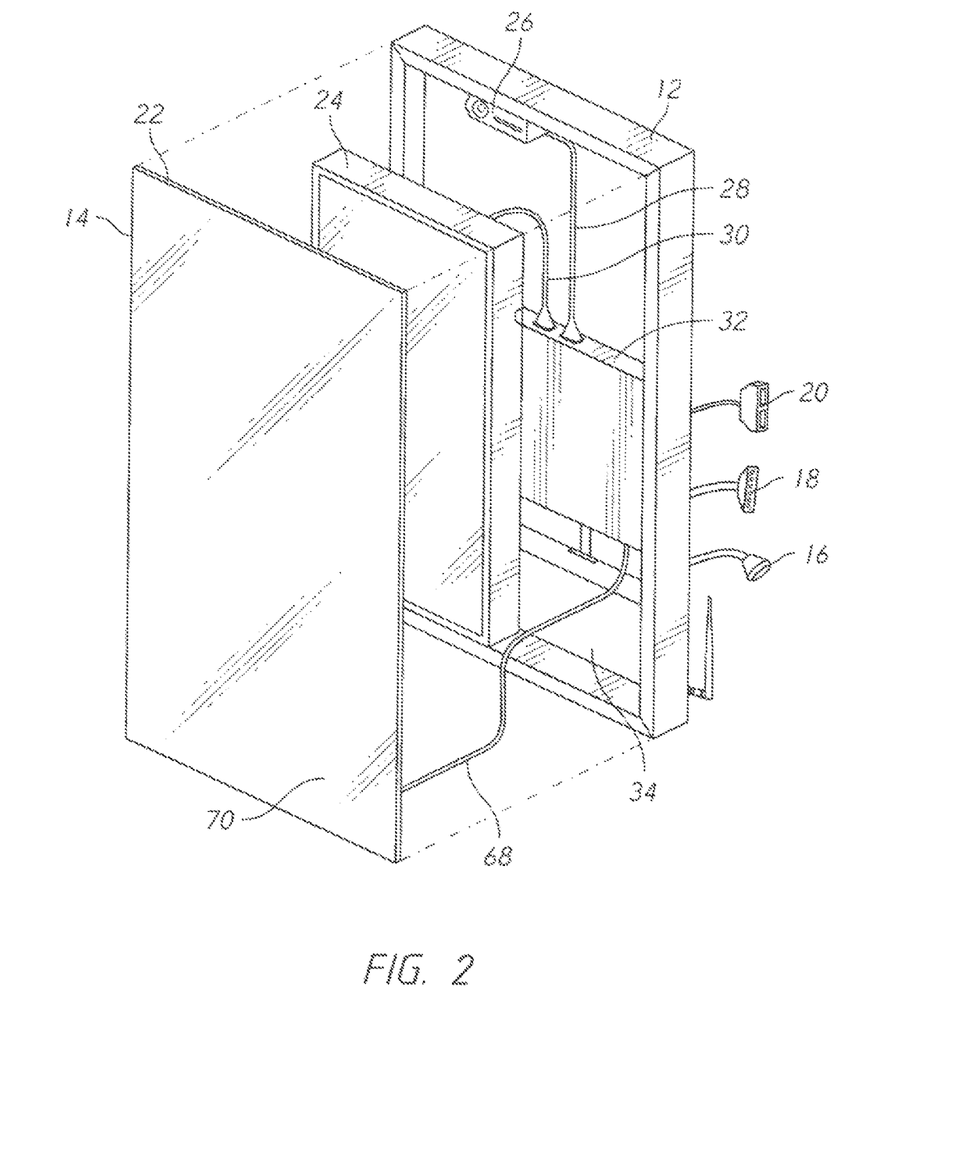
FIG. 2 is an exploded perspective view, showing some internal details of the embodiment of FIG. 1.

FIG. 2 provides an exploded view of the same embodiment. One way mirror 22 is a thin sheet of glass that includes reflective surface 14. The reflective surface is created on a piece of glass plate. The glass plate preferably includes the ability to monitor for a user's touch. As an example, the plate may include a capacitive touch screen system (touch-based interface 70). Cable 68 connects the capacitive touch screen system to computer 32 contained within chassis 12.

Interactive display 24 is mounted immediately behind one-way mirror 22. The interactive display may be any device capable of transmitting images through one-way mirror 22. As an example, display 24 may be an LCD or plasma monitor. Cable 30 connects the interactive display to computer 32. When the interactive display is illuminated, a user standing in front of one-way mirror 22 can see the display through the mirror.

Camera 26 is located within chassis 12 above the top of interactive display 24. It is able to "see" through the one-way mirror and record images of objects on the other side. Alternatively, the metallic coating may be omitted from a portion of the one-way mirror lying directly over the camera to avoid attenuation. Cable 28 connects camera 26 to computer 32.

Power supply 34 provides power for the internal devices within chassis 12 and possibly to external devices as well. Computer 32 may be any convenient type of computing device. It preferably includes an internal memory so that images/videos recorded by camera 26 can be stored. Power connector 16 feeds power into power supply 34. Wireless antenna 66 is used by the computer to wirelessly communicate with other devices. Data connector 20 is used by the computer to exchange data with external digital devices.

Lighting connector 18 is used to control external lights. This control may be done via low-voltage digital signals (such as a digital instruction to a home lighting control system). Alternatively, computer 32 may include switching power output devices (such as AC relays) that allow lighting connector 18 to control external lighting by applying or interrupting AC power to the external lighting. In this version the lighting connector may also apply a direct dimmer function.

Figure 3:
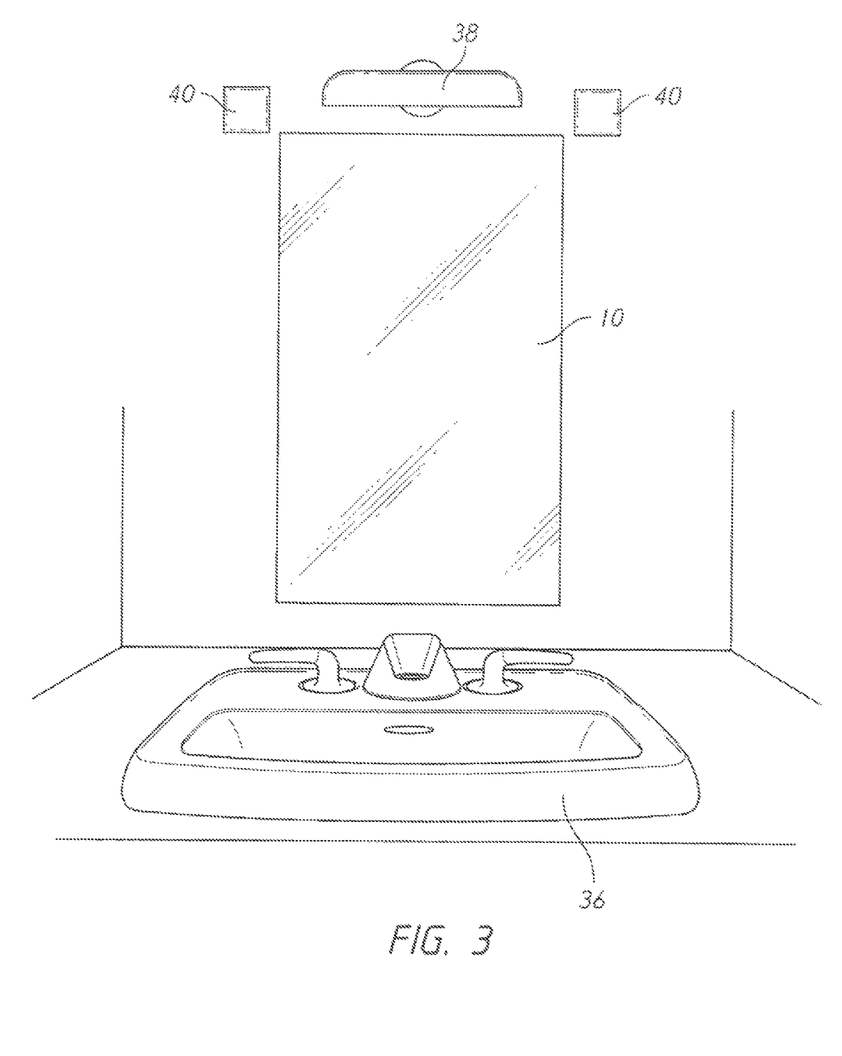
FIG. 3 is a perspective view, showing the embodiment of FIG. 1 installed over a sink.

FIG. 3 shows an exemplary installation of the embodiment depicted in FIGS. 1 and 2. Smart mirror 10 is installed over sink 36. Overhead light 38 is mounted in a conventional position over the inventive smart mirror. Two supplemental lights 40 are added as well. In this installation, the computer within the smart mirror is given control of both overhead light 38 and supplemental lights 40. Both the overhead light and the supplemental lights in this example are controlled by a digital home lighting system. The computer within smart mirror 10 sends digital messages to the home lighting systems in order to control these lights.

As an example, if the user wishes to take an image of a particular jacket and tie he is wearing, the computer in the smart mirror can dim the overhead light and boost supplemental lights 40—thereby providing more direct lighting and producing a better quality image.

In the example of FIG. 3, smart mirror 10 is depicted as being relatively small—about the size of a traditional medicine cabinet. Other embodiments will be much larger and may in fact cover the entire wall above a vanity. In these versions the smart mirror may be embedded into the framing of the structure. In other versions the smart mirror may be hung from just a few attachment points.

Figure 4:
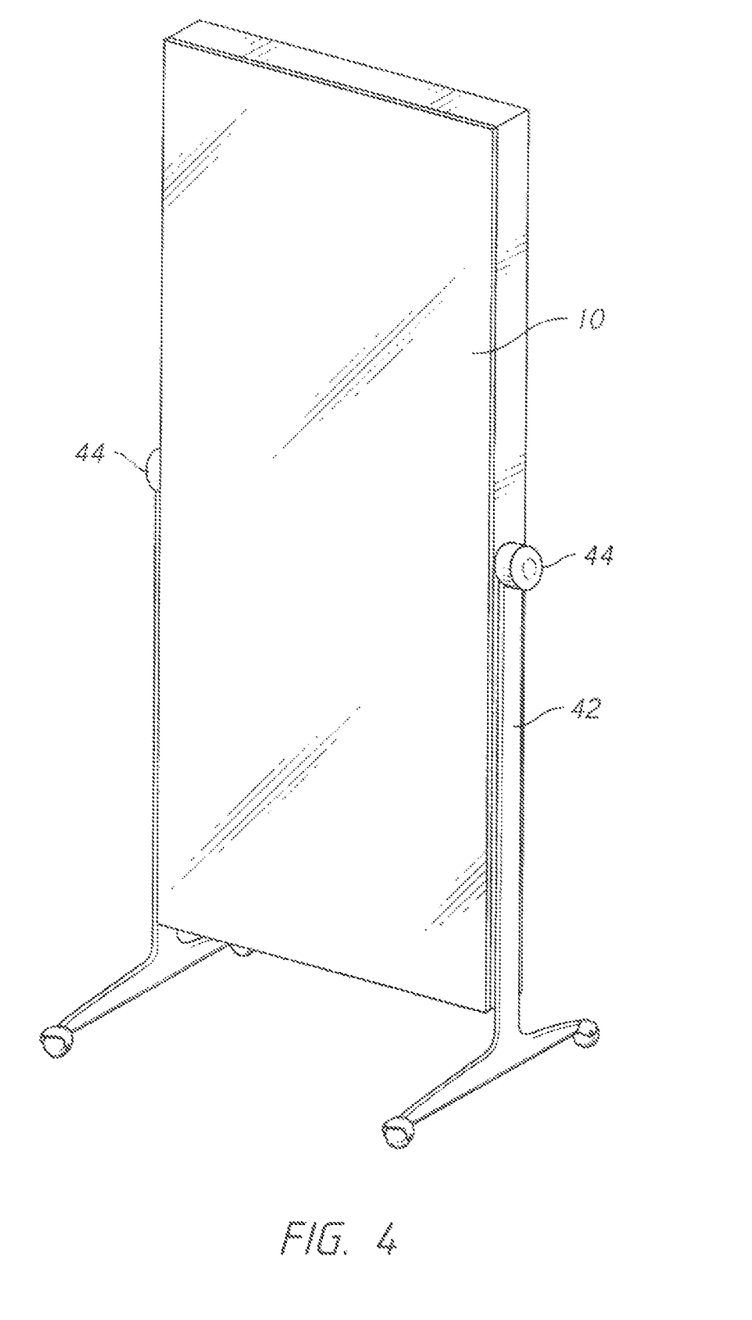
FIG. 4 is a perspective view, showing a free-standing embodiment of the present invention.

Of course, the inventive smart mirror is by no means limited to a vanity-type installation. FIG. 4 depicts another embodiment in which smart mirror 10 is attached to floor mount 42 by a pair of trunnion assemblies 44. Those skilled in the art will realize that this version assumes the form of a traditional floor mirror. It is preferably tall enough to allow a user to see his or her entire reflection. The interactive display in this embodiment is preferably made larger as well.

Figure 5:
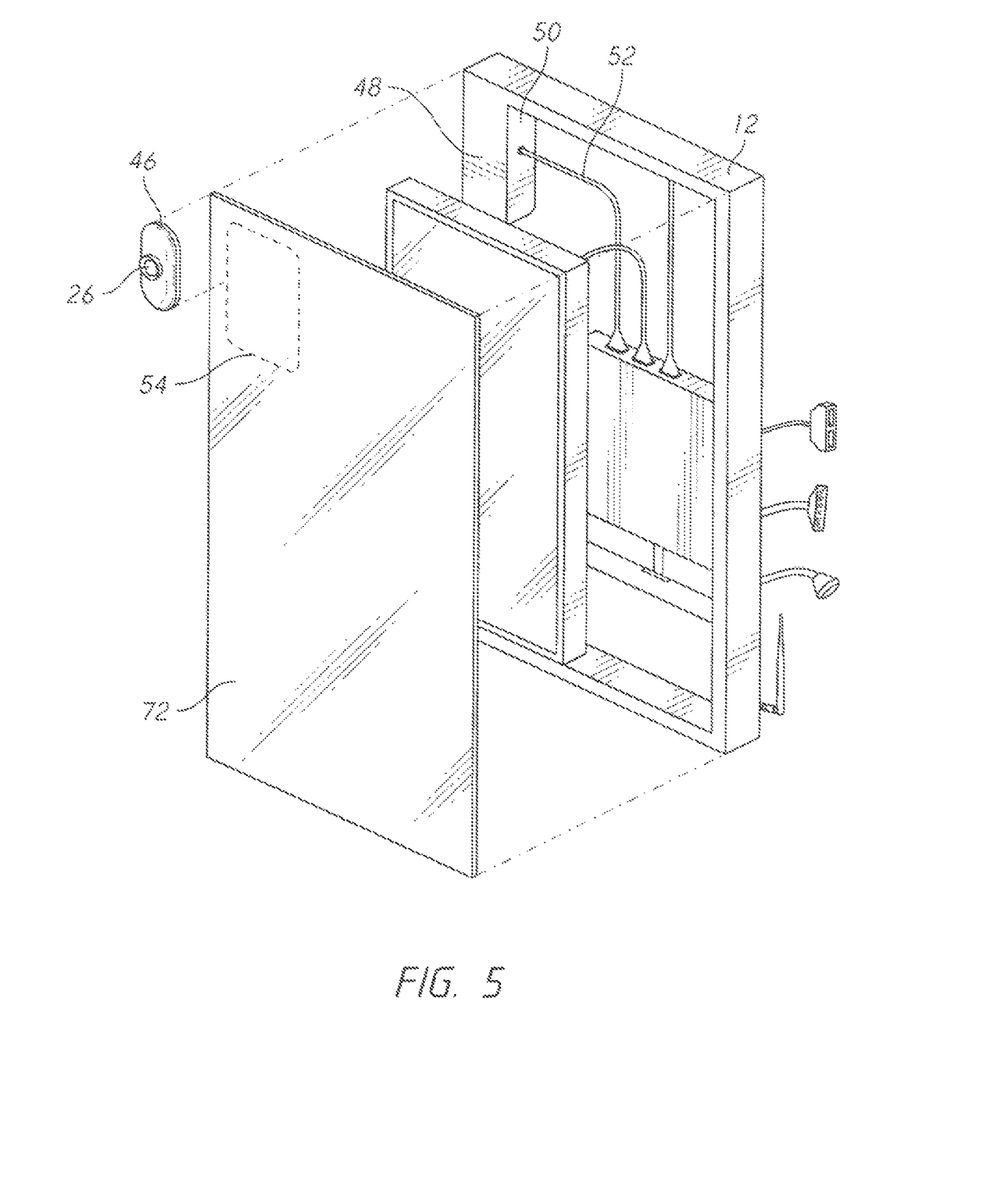
FIG. 5 is an exploded view, showing an alternate embodiment of the present invention.

FIG. 5 shows still another embodiment. In this version the camera is not hard-mounted within chassis 12. Instead, the camera is attached to camera shuttle 46. The camera shuttle incorporates a magnetic base. Magnetic strip 48 is provided along one side of chassis 12. This magnetic strip may simply be a length of ferromagnetic material (such as a 0.090 inch thick plate of mild steel). One-way mirror 22 is preferably made quite thin. When the magnetic base of camera shuttle 46 rests on the outside surface of the one-way mirror, the base is still close enough to magnetic strip 48 to hold the camera shuttle in place. Rubber contact "feet" may be added to the base in order to minimize vertical slippage.

Using this system, the user can position camera shuttle 46 in any desired position along the left side of one-way mirror 22. Camera 26 is preferably placed in a ball-and-socket joint on camera shuttle 46. This allows the user to alter the angle of the camera. The camera preferably includes a wireless link to the computer within the chassis. The inventive mirror may include a positioning mode in which the camera's live feed is displayed to the user on interactive display 48. The user can then adjust the camera in real time until a desired position is obtained. The live feed is then turned off and the camera is used to take still images.

Camera shuttle 46 preferably includes a rechargeable battery that powers the camera and the wireless link to the computer. This battery may be periodically plugged into an external charging device. As an alternative, the battery may be inductively charged. Inductive charger 50 is mounted in the upper left portion of the smart mirror. Charging area 54 may be indicated on the front of the mirror. The user periodically "parks" the camera shuttle in this area so that the inductive charger can couple with an inductive receptor in the camera shuttle. The battery is thereby charged. The duty cycle of the camera is expected to be low (perhaps 5 minutes in any 24 hour period). Inductive charging will therefore be likely to keep pace with the demand.

Figure 6:
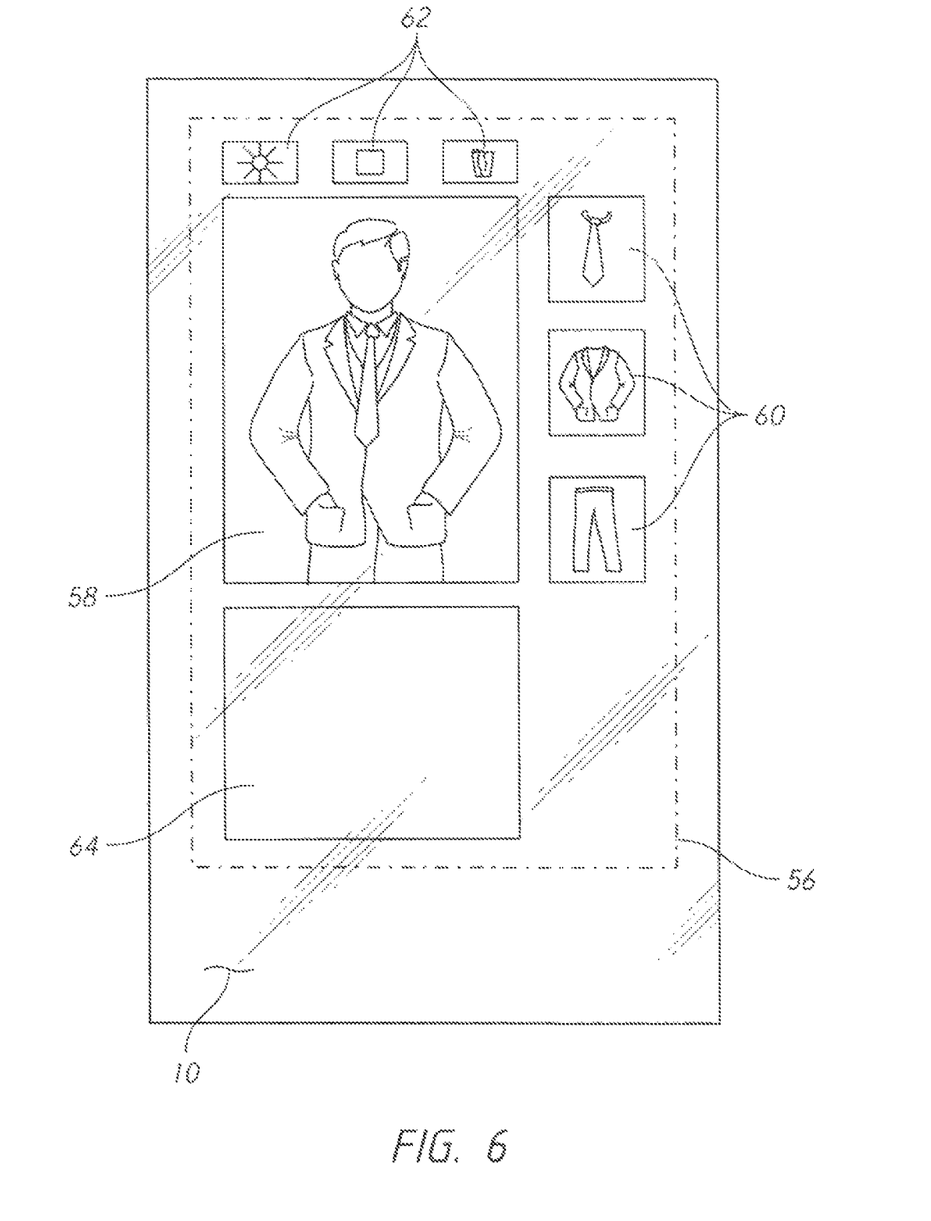
FIG. 6 is an elevation view, showing an exemplary graphical user interface.

FIG. 6 provides a view of a graphical user interface ("GUI") that can be provided through the mirror by interactive display 48. The reader should bear in mind that endless variations are possible for the GUI and the invention is not limited to any particular GUI. Display area 56 represents the area within smart mirror 10 covered by the interactive display. The available display area may be divided in any number of ways. In the version shown, image display 58 provides the current "feed" from the camera. Image display 64 may provide an image retrieved from memory.

Icons 60 down the right side of the display area allow the user to select and categorize wardrobe choices. Icons 62 across the top of the display area allow the user to access local weather information (such as the forecast for the day) and a new summary. The GUI can be used for many and diverse purposes. The capacitive touch screen allows the user to "pick" icons by touching them. The user may also drag and re-size icons and image displays to perform a variety of functions. A "QWERTY" keyboard may also be provided via icons.

Of course, it may be ponderous to enter text by touching the mirror. The reader will recall that the computer within the smart mirror can communicate with other devices by its wireless antenna or data connector. An application running on a smartphone or tablet may be used to enter information that is then transferred into the smart mirror. Using the same transfer methods, the memory in the smart mirror can be periodically backed up to another device or to the cloud.

As a first example of use, the inventive smart mirror can store an image of every wardrobe choice the user makes. The GUI can then allow the user to scroll back through the prior days and display the selections made. In this way the user can avoid unwanted repetition in wardrobe choices.

The inventive smart mirror can provide a variety of other functions, including:

1. The ability to control the lighting used when images are stored so that there is uniformity of the images over time.

2. The ability to be controlled by an application running on an external device such as a smartphone or tablet.

3. The ability to display a calendar and to record events on the calendar.

4. The ability for the user to initiate a "countdown" to the instant when an image is recorded.

5. The ability to categorize wardrobe items and to name and store them in an organized database.

6. The ability to pull previously saved wardrobe items from the database and display an image of the item.

7. The ability to display a "virtual closet" in which the user can select individual items for display.

The use of a programmable Graphical User Interface allows many different storage and presentation options that may be customizable to suit the tastes of a particular user. The inventive mirror may include one or more of the following features:

1. The ability to automatically identify and categorize items by color and/or clothing type. The camera captures a high-resolution digital image that may be processed and manipulated. As an example, software running on the smart mirror's processor could determine that (a) an object near the center of the field of view is a tie, (b) the dominant color of the tie, and (c) the presence of superimposed patterns on the dominant color. The software could then save the image in a sorting data folder. As an example, the software could create a folder entitled "ties/red/striped." The software would then place other similar ties in the same folder. The user would then be given a graphical depiction of folders and subfolders for ties. The user could select a particular tie and recall its image. The system could also provide a warning to the user if the user attempted to wear a red tie two days in a row.

2. As an alternative to the automatic identification and categorization scheme, the user could be given icons allowing the easy manual categorization of items. As an example, once an image is captured, the user could make a manual "pick" on a display of the image and identify an item as a tie and identify a color and category for the tie. The user could also categorize an item by clothing type (business attire, casual, athletic, etc.).

3. The ability to display images from multiple days in a scrolling format. As an example, the attire selected for the last five business days could be displayed in a linear group, or as one image at a time with the ability to pick and slide to the next image.

4. The ability to display a calendar that is synchronized with an external calendar such as one created via OUTLOOK. The user would preferably be given the ability to pick on a calendar day and have the wardrobe image captured by the smart mirror on that day appear. As an example, the user might select a business meeting from 30 days past on the calendar and the inventive system would recall an image of the wardrobe selection for that day. This functionality would allow the user to avoid repeating the same selections from the last meeting.

5. The ability to display all the images captured for a particular day by selecting that day on the calendar display. Each of the images displayed would be tagged with any categories relating to it. An example would be a full length image of the user in a blue business suit with a light blue shirt, a pink tie, and a selected new hairstyle. The displayed image would include relevant labels such as "Business Attire/Suit:Navy Blue/Dress Shirt:Light Blue/Tie:Pink, Solid/Hair: Short, Mohawk."

6. The ability to provide sorting features, whether based on automatically created categorizations or manually entered categorizations. For example, the user can be given a tie icon. When this is selected a group of subcategories appear ("Solid, Striped, Complex Patterns, Whimsical"). When the user makes a selection more subcategories appear until the user is eventually looking at images of actual ties.

7. The ability to respond to voice commands. A microphone can be included in the processor inputs. A speech-recognition module can be included as well. This functionality would allow the user to communicate via the spoken word instead of manual selections. As an example, the user might say "Tie . . . Solid . . . Red." The inventive mirror would then display images of the ties meeting those descriptions. The display could also label the images (such as 1, 2, 3, 4). The user might then say "Choose number 3" to select a particular tie. Upon the selection of a particular item then inventive system could then retrieve an image of the user wearing that particular tie. The system could also provide the calendar display with days highlighted for the prior times when the selected tie was worn.

8. The ability to recognize meaning in the spoken word. Beyond simple voice commands, the inventive system is preferably able to discern meaning from natural language queries and commands. For example, the user might ask "Mirror, when was the last time I wore a blue tie?" The inventive system would parse this statement to determine its intent. The system would then search through its stored and categorized images to retrieve instances of a blue tie. The system would then display the answer on the GUI. Alternatively, the inventive system could be given a speech-synthesizing module so that the answer could be given verbally.

The preceding description contains significant detail regarding the novel aspects of the present invention, it should not be construed, however, as limiting the scope of the invention but rather as providing illustrations of the preferred embodiments of the invention. The scope of the invention should be fixed by the following claims rather than by the examples given.

Having described my invention, I claim:

1. A interactive smart mirror, comprising
   a. a chassis;
   b. a one-way mirror attached to said chassis, said one-way mirror having an outward facing side and an inward facing side;
   c. a computer having an associated memory;
   d. an interactive display connected to said computer, said interactive display being located on said inward facing side of said one-way mirror and being configured to display an image through said one-way mirror to said outward facing side of said one-way mirror;
   e. said one-way mirror including a touch-based interface, with said one-way mirror being connected to said computer so that a touch detected by said touch-based interface can be communicated to said computer;
   f. said chassis including a magnetic strip
   g. a camera mounted on a camera shuttle, said camera shuttle configured to rest on said outward facing surface of said one-way mirror and be held in position by a magnet located within said camera shuttle configured to attract said camera shuttle toward said magnetic strip, whereby a position of said camera shuttle on said outward facing surface of said one-way mirror can be altered; and
   said camera being connected to said computer so that images captured by said camera can be stored within said memory associated with said computer.

2. The interactive smart mirror as recited in claim 1, further comprising a data link whereby said computer can communicate with an external device.

3. The interactive smart mirror as recited in claim 2, wherein said data link is a wireless data link.

4. The interactive smart mirror as recited in claim 3, further comprising a floor mount.

5. The interactive smart mirror as recited in claim 2, wherein said data link is a hardwired link.

6. The interactive smart mirror as recited in claim 2, further comprising a graphical user interface displayed on said interactive display, wherein said graphical user interface displays an icon and monitors for the selection of said icon through said touch-based interface.

7. The interactive smart mirror as recited in claim 2, further comprising a floor mount.

8. The interactive smart mirror as recited in claim 1, further comprising an external light controlled by said computer.

9. The interactive smart mirror as recited in claim 1, further comprising a graphical user interface displayed on said interactive display, wherein said graphical user interface displays an icon and monitors for the selection of said icon through said touch-based interface.

10. The interactive smart mirror as recited in claim 1, further comprising a floor mount.

11. A interactive smart mirror, comprising
    a. a chassis;
    b. a one-way mirror attached to said chassis, said one-way mirror having an outward facing side and an inward facing side;
    c. a computer having an associated memory;
    d. an interactive display connected to said computer, said interactive display being located on said inward facing side of said one-way mirror and being configured to display an image through said one-way mirror to said outward facing side of said one-way mirror;
    e. said one-way mirror including a touch-based interface, with said one-way mirror being connected to said computer so that a touch detected by said touch-based interface can be communicated to said computer;
    f. said chassis including a magnetic strip;
    g. a camera shuttle located on said outward facing side of said one-way mirror, said camera shuttle configured to slide along said outward facing side of said one-way mirror, with said camera shuttle being held in position by a magnet located within said camera shuttle configured to attract said camera shuttle toward said magnetic strip, whereby a position of said camera shuttle on said outward facing surface of said one-way mirror can be altered;
    h. a camera located on said camera shuttle, said camera configured to capture images of objects lying on said outward facing side of said one-way mirror; and
    i. said camera being connected to said computer so that images captured by said camera can be store within said memory associated with said computer.

12. The interactive smart mirror as recited in claim 11, further comprising a data link whereby said computer can communicate with an external device.

13. The interactive smart mirror as recited in claim 12, wherein said data link is a wireless data link.

14. The interactive smart mirror as recited in claim 13, further comprising a floor mount.

15. The interactive smart mirror as recited in claim 12, wherein said data link is a hardwired link.

16. The interactive smart mirror as recited in claim 12, further comprising a graphical user interface displayed on said interactive display, wherein said graphical user interface displays an icon and monitors for the selection of said icon through said touch-based interface.

17. The interactive smart mirror as recited in claim 12, further comprising a floor mount.

18. The interactive smart mirror as recited in claim 11, further comprising an external light controlled by said computer.

19. The interactive smart mirror as recited in claim 11, further comprising a graphical user interface displayed on said interactive display, wherein said graphical user interface displays an icon and monitors for the selection of said icon through said touch-based interface.

20. The interactive smart mirror as recited in claim 11, further comprising a floor mount.

* * * * *